Feb. 2, 1954

C. D. HARRIS ET AL 2,667,765

WINDOW MOUNTED AIR CONDITIONING UNIT

Filed Jan. 22, 1952

Inventors:
Charles D. Harris
Joseph R. Galazzi
Paul O. Pippel
Atty.

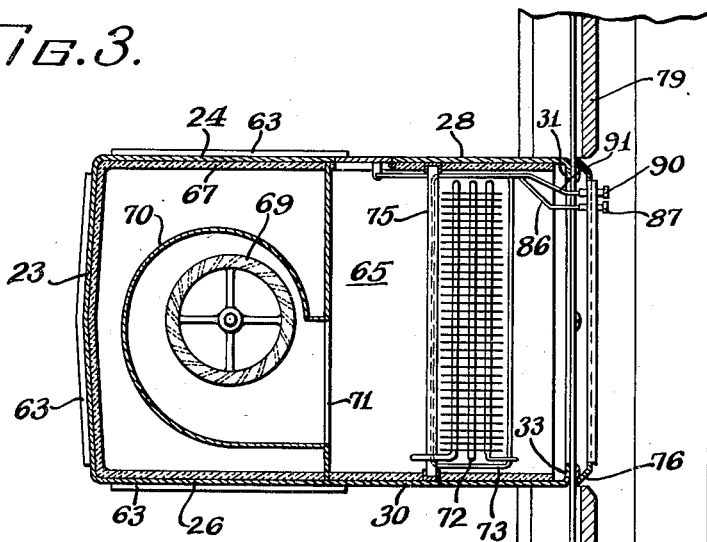
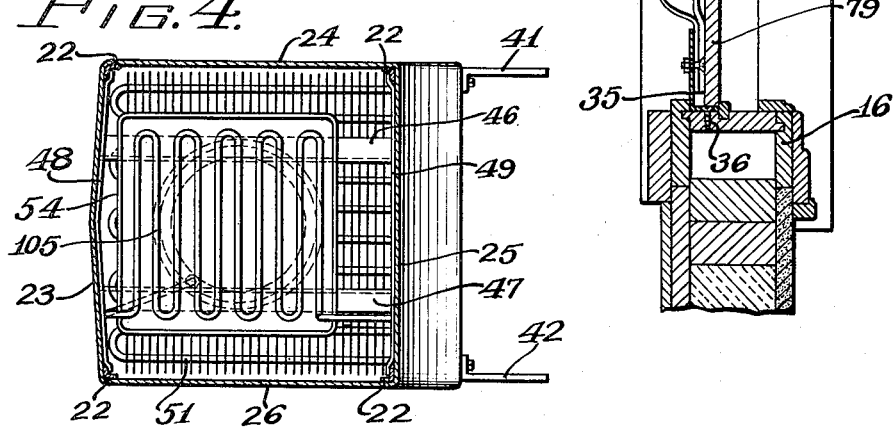
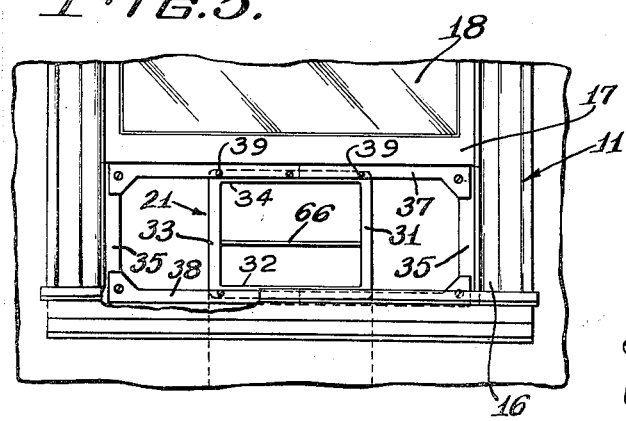

Feb. 2, 1954 C. D. HARRIS ET AL 2,667,765
WINDOW MOUNTED AIR CONDITIONING UNIT
Filed Jan. 22, 1952 3 Sheets-Sheet 3
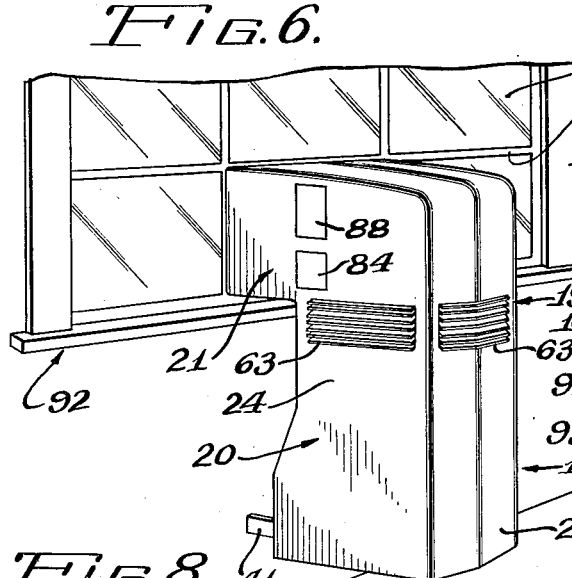
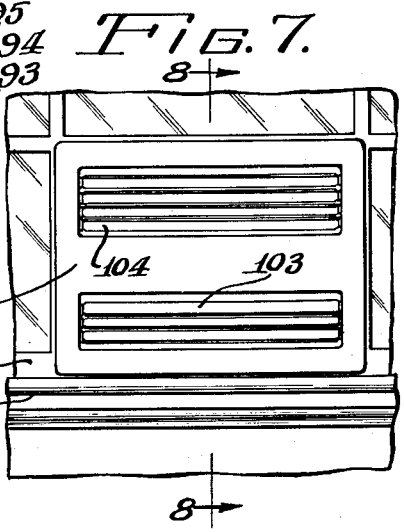
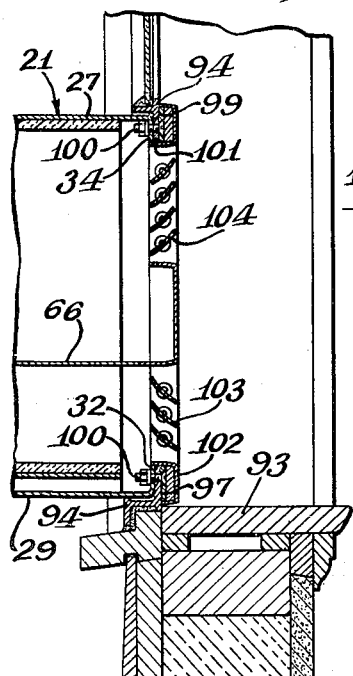
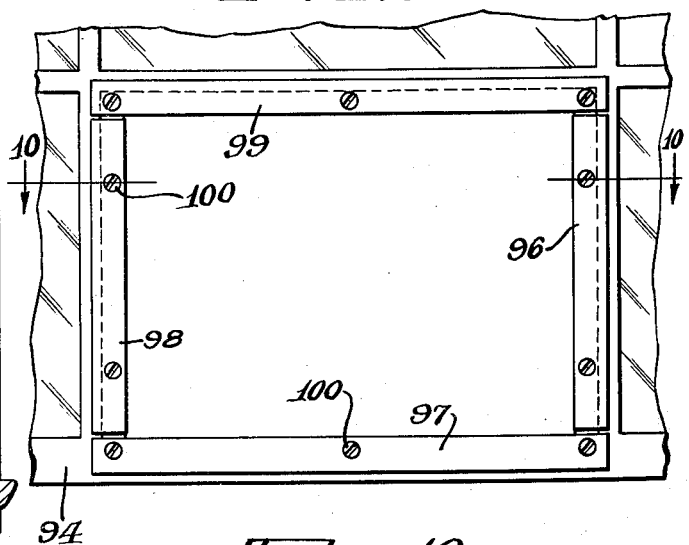
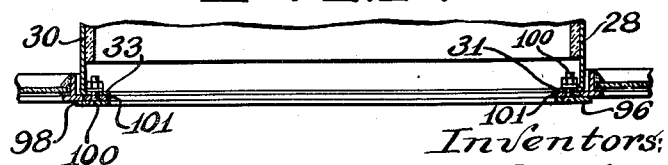
Inventors:
Charles D. Harris
Joseph A. Galazzi
Paul O. Pippel Atty.

Patented Feb. 2, 1954

2,667,765

UNITED STATES PATENT OFFICE 2,667,765

WINDOW MOUNTED AIR CONDITIONING UNIT

Charles D. Harris and Joseph A. Galazzi, Evansville, Ind., assignors to International Harvester Company, a corporation of New Jersey Application January 22, 1952, Serial No. 267,542

8 Claims. (Cl. 62—140)

This invention relates generally to an air conditioning system and more particularly to a room air conditioner which is mounted outside a room window.

The conventional type of window mounted air conditioner is generally secured to a window sill with the high side compartment disposed outside the window and the low side compartment projecting through the window into the room. Such units are objectionable to most owners in that they obstruct a considerable portion of the window and prevent complete closure of the window sash. Furthermore, since a good portion of the noise making mechanism is within the air conditioned space, it is difficult to prevent this noise entering the room being cooled. For this reason they are usually removed from the window during the winter months and then replaced for the hot summer months. These units are difficult to install in a casement type window since a considerable portion of the frame and glass must be removed from the window in order to provide a place for the unit. The present invention provides a window mounted room air conditioner which overcomes these disadvantages.

One object of the present invention is to provide an air conditioning unit which is adapted to be mounted in a double hung sash type window and also in a casement type window.

Another object of the invention is to provide an air conditioning unit which is secured to a window sill of a room to be conditioned with the entire unit disposed exteriorly of the room.

Another object of the invention is to provide a window mounted air conditioner unit so positioned in relation to the lower sash of a double hung sash type window that the sash may be completely closed without removing the unit.

Another object of the invention is to provide an air conditioning unit which can be easily mounted in a casement type window upon removal of only one pane of glass from the window.

Another object of the invention is to provide a window type air conditioner so located that a minimum amount of operating noise from the refrigeration system and air circulating means will be projected into the room being conditioned.

Another object of the invention is to provide a room air conditioner having a condenser so located that outside air may be conveniently circulated thereover so as to provide excellent cooling thereof.

Another object of the invention is to provide an outside mounted air conditioner which may be permanently installed for year around operation.

Another object of the invention is to provide a room air conditioner having a cabinet of such size that the refrigeration system and associated parts are located therein without overcrowding.

Another object of the invention is to provide a window mounted air conditioner with means for effectively removing moisture which condenses on the evaporator.

Another object of the invention is to provide a room air conditioner with damper means which may be selectively set to recirculate room air over the evaporator, or to evacuate air from the room, or to circulate air from outdoors over said evaporator.

With these and numerous other objects in view, the invention consists in the novel features of construction, combination and arrangement of parts as will be hereinafter referred to and more particularly pointed out in the specification and claims.

In the accompanying drawing forming a part of this application:

Fig. 3 is a horizontal sectional view taken along line 3—3 of Fig. 2.

Fig. 4 is a horizontal sectional view taken along line 4—4 of Fig. 2.

Fig. 5 is an elevational view of the lower portion of the inner window casing showing the unit mounted therein with the grille removed therefrom.

Fig. 6 is a perspective view of the air conditioning unit mounted outside a casement type window.

Fig. 7 is an elevational view of the lower portion of the inner window casing of Fig. 6 showing the unit mounted therein.

Fig. 8 is an enlarged sectional view taken along line 8—8 of Fig. 7.

Fig. 9 is an elevational view of the lower portion of the inner window casing of Fig. 6 showing the unit mounted therein with the grille removed.

Fig. 10 is a cross sectional view taken along line 10—10 of Fig. 9.

Figure 1:
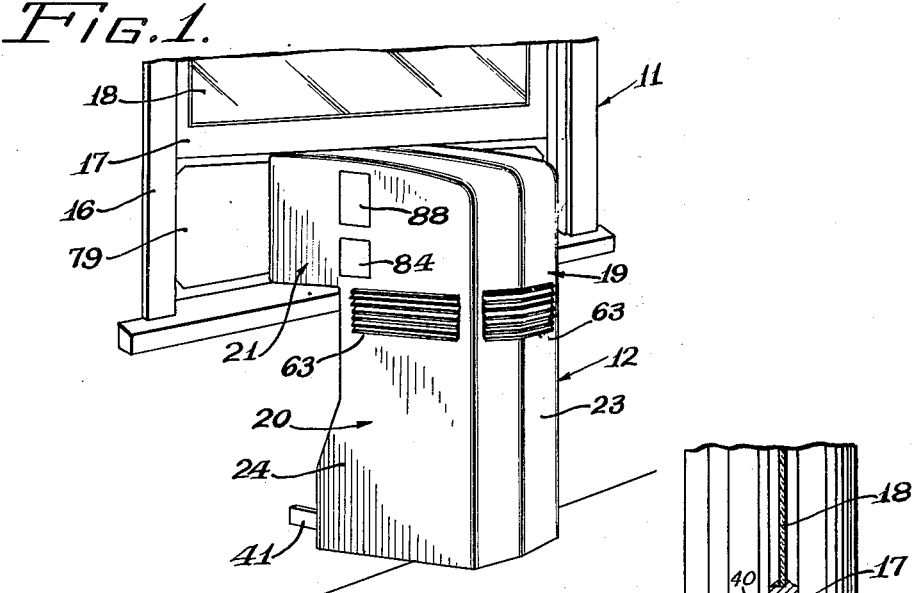
Fig. 1 is a perspective view of an air conditioning unit mounted outside a double hung sash type window.

Referring to the drawings for a detailed description of the invention, a portion of an outer wall 10 of a building having a conventional double hung sash type window 11 is shown in Fig. 1.

An air conditioning unit 12 is secured on the outer surface of the wall 10 with the upper portion thereof projecting into the window 11. The outer wall 10 comprises spaced apart inner member 13 and outer member 14 with any suitable matter 15 disposed therebetween. The window 11 comprises a window casing 16 and a lower sash 17 having a window pane 18 secured therein. The sash 17 is slidably secured in the casing 16 in order that it may be raised and lowered.

Figure 2:
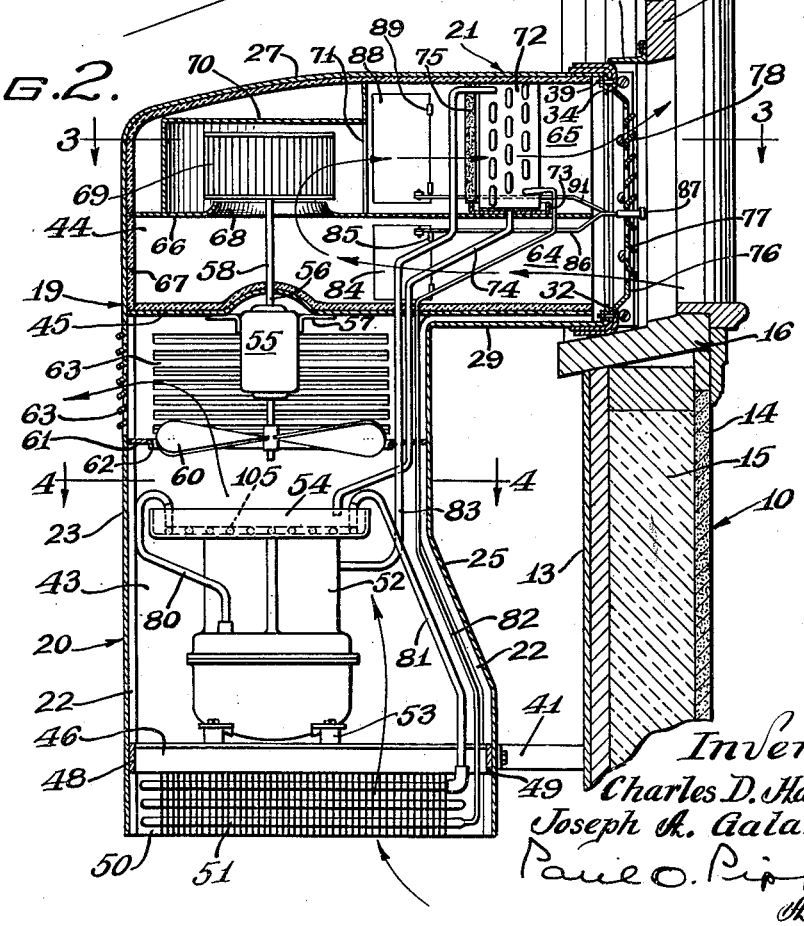
Fig. 2 is an enlarged vertical sectional view of the unit of Fig. 1.

The air conditioning unit 12 comprises an outer casing 19 having a generally rectangular shaped vertically disposed body portion 20 and a horizontally disposed duct or elbow section 21 extending from the upper portion of the casing. Vertical extending channel members 22 are disposed in each corner of the casing 19 to which are attached the front wall 23, side wall 24, rear wall 25, side wall 26 and top wall 27 of the casing. Elbow section 21 comprises a side wall 28, bottom wall 29, side wall 30 and the top wall 27 which terminate in bent-in edge portions 31, 32, 33 and 34 respectively. L-shaped channel members 35 are positioned proximate to the vertical sides of the window casing 16 with one leg secured thereto by screws 36 and the other leg extending at right angles thereto. A top support member 37 and a bottom support member 38 are secured to the extending legs of the channels 35 and extend across the width of the window casing 16. The inturned edges 32 and 34 of the elbow section 21 are secured to the support members 37 and 38 by bolts 39. The channels 35, support members 37 and 38 and the casing 19 are all disposed in spaced relationship to the window sash 17 as seen in Fig. 2 so that it can be raised and lowered completely. A resilient member 40 is attached to the sash frame 17 whereby it will shield the space between the sash 17 and the top wall 27 when the sash 17 is raised as seen in Fig. 2, and will flex upwardly when the sash 17 is lowered. Two angle members 41 and 42 are bolted to the lower portion of the rear wall 25 with their ends abutting the outer member 13 of wall 10 whereby the casing 19 is held in spaced relationship to the wall 10.

The casing 19 is divided into a high side compartment 43 and a low side compartment 44 by a horizontally disposed partition 45. Two transversely extending channels 46 and 47 are located in the lower portion of the casing 19 and are secured to two cross members 48 and 49, the ends of which are secured to the corner channel members 22 by welding or the like. The lower end 50 of casing 19 is open and a finned tube condenser 51 is positioned across the open end 50 and fastened to the channel members 46 and 47. A hermetically sealed motor-compressor assembly 52 is positioned above the channel members 46 and 47 and secured thereto by resilient mounts 53. A rectangular shaped tray 54 is secured to the flat top of the motor-compressor unit 52 in heat exchange relation thereto. A serpentine shaped coil 105 is disposed within the tray 54 and is held in heat exchange relation with the bottom of the tray in any suitable manner. An electric motor 55, having a double end armature shaft 56, is fastened to partition 45 by brackets 57. The upper end 58 of the shaft 56 extends through partition 45 whereas the lower end 59 extends below the motor 55 and is provided with a propeller type fan 60. A rectangular shaped baffle 61 is secured to the walls of the casing 19 and is provided with a circular opening 62 which surrounds the blade tips of the fan 60. The front wall 23 and side walls 24 and 26 are provided with louvers 63 through which air being circulated by fan 60 will be expelled.

Low side compartment 44 is divided into an inlet passageway 64 and an outlet passageway 65 by a partition 66. The walls of the low side compartment 44 are covered by an insulating material 67 which reduces the amount of heat transfer therethrough. Upper end 58 of the motor shaft 56 extends upwardly through a circular opening 68 provided in partition 66 and a centrifugal type fan 69 is mounted on the shaft 56 adjacent opening 68. The fan 69 is encased by a housing 70 which has an outlet opening 71 directed into outlet passageway 65. A finned tube evaporator 72 extends across the outlet passageway 65 and is secured over a pan 73 which rests upon partition 66. Pan 73 is connected to tray 54 by a drain tube 74 having the upper end thereof connected into pan 73 and the lower end positioned over tray 54. A filter element 75 is disposed in front of evaporator 72 for the purpose of filtering air which flows therethrough. A grille member 76 is fastened to elbow section 21 and is provided with lower louvers 77 and upper louvers 78 for the purpose of directing air streams into inlet passageway 64 and directing air streams from the outlet passageway 65 into the interior of the room. As seen in Fig. 3, the width of the casing 19 is substantially less than window 11. Baffle or filler elements 79 are positioned on each side of the casing in alignment with grille 76 in order to close the open spaces between the casing 19 and the window casing 16. The filler elements 79 and grille element 76 could be constructed as one unit if desired.

The motor-compressor unit 52 is energized by a suitable power supply (not shown) and operates to compress a suitable refrigerant when energized. This compressed refrigerant is conveyed by conduit 80 to tray coil 105, then through conduit 81 to condenser 51. As the refrigerant flows through condenser 51 it will be cooled and condensed, after which it is metered into evaporator 72 by a restrictor tube 82. The refrigerant is heated and vaporized during its journey through the evaporator 72 and is then returned by conduit 83 to the intake of the motor-compressor unit 52 from where it will again be recompressed and forwarded through the refrigeration system.

During the operation of the refrigeration system, fan motor 55 will also be energized in order to rotate fan 60 and fan 69. Fan 60 will pull outside air upwardly from open end 50 through the high side compartment 43 and then exhaust it through louvers 63. As the air moves through the compartment 43, it wipes over the finned surfaces of condenser 51 and cools the hot refrigerant flowing therethrough. It then passes over the motor-compressor unit 52 and removes heat therefrom so that the temperature thereof is maintained within a proper operating range. The baffle 61 prevents reverse flow of air around the fan 60 and assures a steady stream of cooling air through the compartment 43.

Blower fan 69 will create a low pressure within inlet passageway 64 during its operation, whereby room air will be sucked from the lower portion of the room through louvers 77 into inlet passageway 64. This air will then be forced through housing 70 into outlet passageway 65, then through filter 75 into contact with evaporator 72. Upon contact of the cold surfaces of the evaporator 72 the air will be cooled and some of the moisture carried thereby will be condensed on the evaporator from which it will drain into pan 73. Tube 74 will convey the condensate from the pan 73 into tray 54 where it will contact the coil 105. Since the temperature of coil 105 will be quite high, the condensate will be heated to a vapor, and this vapor will be picked up by the air stream created by fan 60 and expelled through louvers 63. After the air within outlet passageway 65 has been cooled and dehumidified by evaporator 72, it is forced through outlet louvers 78 into the upper portion of the room.

Inlet passageway 64 is provided with a rectangular opening in side wall 28 and a damper 84 is secured therein by hinges 85. A rod 86 connects the damper 84 to a knob 87 so that the damper 84 may be rotated about hinges 85 to open position by pushing knob 87 inwardly. Outlet passageway 65 is provided with a rectangular opening in side wall 28 in which a damper 88 is secured by hinges 82. A second knob 90 is connected to damper 88 by a rod 91 whereby the damper 88 may be rotated to open position by moving knob 90 inwardly. Suitable controls (not shown) may be provided for controlling the operation of motor-compressor unit 52 and fan motor 55 in order that the fan motor 55 may be operated alone, or the fan motor 55 and motor-compressor unit 52 may be operated simultaneously.

When the room air is to be cooled and dehumidified, dampers 84 and 88 are closed and fan motor 55 and motor-compressor unit 52 are energized whereby the system operates in the manner explained heretofore. By opening damper 84 outside air is pulled into inlet passageway 64 and mixed with the room air being pulled through louvers 77. If only circulation of room air is desired, fan motor 55 alone is energized and dampers 84 and 88 are both closed. To force fresh air into the room, damper 84 is opened and damper 88 is closed. To remove stale air from the room, damper 88 is opened and damper 84 is closed. By this arrangement, the room air will be properly conditioned by the unit 12.

Figs. 6-10 of the drawing shows a casement type window 92 in which the unit 12 is installed. The window 92 comprises a window casing 93, a frame 94 and individual window panes 95. The elbow section 21 of casing 19 is constructed with an outside dimension substantially the same as a window pane of a conventional casement type window.

In the modification shown in Figs. 6-10, a centrally located lower window pane has been removed from the frame 94 and the unit 12 is positioned outside the window with the inturned edge portions 31, 32, 33 and 34 located adjacent to the frame 94. Fastening members 96, 97, 98 and 99 are then lapped over the inner edges of the frame 94 and secured to the inturned edges 31, 32, 33 and 34 respectively by bolts 100. If needed, spacer members 101 may be inserted between the fastening members and the inturned edge portions. A grille member 102 is then fastened over the fastening members with intake louvers 103 and outlet louvers 104 positioned therein.

From the foregoing it can be seen that an air conditioning unit is provided which can be easily and quickly installed outside a room window. This unit can be installed in either a double hung sash type window or a casement type window. The duct which extends into the window is of small size so that it will obstruct only a small portion of the window. Since the unit is disposed outside the room it will not obstruct any floor space and the machinery is far enough removed from the room that the heat and operating noise generated thereby will be insulated from the room. The outer casing of the unit is constructed with a large cross sectional area in order to prevent crowding of the machinery and high resistance to air circulation therethrough. By providing a weather resistance outer casing, the unit may be retained in operating position throughout the year.

While the invention has been described with some detail, it is to be understood that the description is for the purpose of illustration only and is not definitive of the limits of the inventive idea. The right is reserved to make such changes in the details of construction and arrangement of parts as will fall within the purview of the attached claims.

What is claimed is:

1. In a unit for conditioning room air, the combination of a cabinet secured to the outer surface of a building wall adjacent a window which opens into a room; a partition for dividing the cabinet into a low side compartment and a high side compartment; said cabinet being provided with a projection which extends into said window and terminates adjacent the outer surface of a window pane; said projection being provided with an opening which connects said low side compartment to said room; a wall member for dividing said low side compartment and projection into an air inlet passageway and an air outlet passageway; fan means for pulling room air through said opening, circulating the air through said inlet passageway and said outlet passageway, and then returning it to said room through said opening; an evaporator disposed across said outlet passageway whereby the air circulating therethrough will be cooled; a first opening provided in said cabinet which connects said inlet passageway to outside air; valve means for opening and closing said first opening; a second opening provided in said cabinet between said evaporator and said inlet passageway which connects said outlet passageway to outside air; and valve means for opening and closing said second opening.

2. In a unit for conditioning room air, the combination of a cabinet comprising a horizontal section and a vertical section; said cabinet being secured with said vertical section adjacent the outer surface of a building wall and the horizontal section extending into a window which opens into a room; a partition for dividing said cabinet into an upper compartment and a lower compartment; said horizontal section connecting said upper compartment to said room; an evaporator disposed within said upper compartment; first fan means for circulating room air through said horizontal section into contact with said evaporator; a condenser mounted within said lower compartment; second fan means for circulating outside air into contact with said condenser; and an electric motor secured within said lower compartment which drives said first fan means and said second fan means.

3. In a unit for conditioning room air, the combination of a cabinet comprising a horizontal section and a vertical section; said cabinet being positioned with said vertical section adjacent the outer surface of a building wall and the horizontal section extending into a window which opens into a room; a partition for dividing said cabinet into an upper compartment and a lower compartment; said horizontal section connecting said upper compartment to said room; an evaporator disposed within said upper compartment; a condenser and compressor mounted within said lower compartment; an electric motor positioned in said lower compartment and secured to said partition; said motor leaving a vertical disposed double end shaft; first fan means positioned in said lower compartment and secured to the lower end of said shaft; and second fan means positioned in said upper compartment and secured to the other end of said shaft.

4. In a unit for conditioning room air, the combination of a cabinet comprising a horizontal section and a vertical section; said cabinet being positioned with said vertical section adjacent the outer surface of a building wall and the horizontal section extending into a window which opens into a room; a partition for dividing said cabinet into an upper compartment and a lower compartment; said horizontal section connecting said upper compartment to said room; means for dividing said upper compartment into an inlet passageway and outlet passageway; an evaporator positioned across said outlet passageway; first fan means positioned between said inlet passageway and said outlet passageway for circulating room air therethrough into contact with said evaporator; said lower compartment being provided with an air inlet in the bottom thereof and air outlets in the sides thereof; a condenser positioned in said lower compartment across said air inlet; and second fan means positioned in said lower compartment which operates to circulate outside air upwardly through said air inlet and out said air outlets.

5. In a unit for conditioning room air, the combination of a cabinet comprising a horizontal section and a vertical section; said cabinet being positioned with said vertical section adjacent the outer surface of a building wall and the horizontal section extending into a window which opens into a room; a partition for dividing said cabinet into an upper compartment and a lower compartment; said horizontal section connecting said upper compartment to said room; means for dividing said upper compartment into an inlet passageway and outlet passageway; an evaporator positioned across said outlet passageway; first fan means positioned between said inlet passageway and said outlet passageway for circulating room air therethrough into contact with said evaporator; said lower compartment being provided with an air inlet in the bottom thereof and air outlets in the sides thereof; a condenser positioned in said lower compartment across said air inlet; second fan means positioned in said lower compartment which operates to circulate outside air upwardly through said air inlet and out said air outlets; and motor means located in said lower compartment for driving said first fan means and said second fan means.

6. In a unit for conditioning room air, the combination of a cabinet comprising a horizontal section and a vertical section; said cabinet being positioned with said vertical section adjacent the outer surface of a building wall and the horizontal section extending into a window which opens into a room; a partition for dividing said cabinet into an upper compartment and a lower compartment; said horizontal section connecting said upper compartment to said room; means for dividing said upper compartment into an inlet passageway and outlet passageway; an evaporator positioned across said outlet passageway; first fan means positioned between said inlet passageway and said outlet passageway for circulating room air therethrough into contact with said evaporator; said lower compartment being provided with an air inlet in the bottom thereof and air outlets in the sides thereof; a condenser positioned in said lower compartment across said air inlet; second fan means positioned in said lower compartment which operates to circulate outside air upwardly through said air inlet and out said air outlets; a compressor secured in said lower compartment above said condenser; a coil connected between said compressor and said condenser; and means for collecting water which condenses on said evaporator and passing it into contact with said coil.

7. In a unit for conditioning room air, the combination of a cabinet comprising a horizontal section and a vertical section; said cabinet being positioned with said vertical section adjacent the outer surface of a building wall and the horizontal section extending into a window which opens into a room; a partition for dividing said cabinet into an upper compartment and a lower compartment; said horizontal section connecting said upper compartment to said room; means for dividing said upper compartment into an inlet passageway and outlet passageway; an evaporator positioned across said outlet passageway; first fan means positioned between said inlet passageway and said outlet passageway for circulating room air therethrough into contact with said evaporator; said lower compartment being provided with an air inlet in the bottom thereof and air outlets in the sides thereof; a condenser positioned in said lower compartment across said air inlet; second fan means positioned in said lower compartment which operates to circulate outside air upwardly through said air inlet and out said air outlets; a compressor secured in said lower compartment above said condenser; a coil connected between said compressor and said condenser; means for collecting water which condenses on said evaporator and passing it into contact with said coil; and motor means located in said lower compartment for driving said first fan means and said second fan means.

8. In a unit for conditioning room air, a cabinet secured to the outside of a building adjacent a window thereof, a low side compartment disposed within the upper portion of said cabinet, a duct formed as an extension of said cabinet and connecting said low side compartment to said window, a wall disposed within and dividing said low side compartment and said duct into an air inlet passageway and an air outlet passageway, an opening in said wall at the end opposite from said window, a fan mounted in cooperation with said opening whereby air from within the building is drawn into said inlet passageway, through said opening in said wall, through said outlet passageway, and into said building, when said fan is operated, an evaporator mounted within said outlet passageway adjacent to said duct, so that air passing therethrough is cooled, two vents formed through one wall of said cabinet, the first of said vents positioned within said inlet passageway between said duct and said opening in said wall, the second of said vents positioned between said evaporator and said opening in said wall, door means mounted to one side of said first vent within said inlet passageway and selectively cooperating therewith in varying degrees for closing said first vent and for opening said inlet passageway in varying degrees, second door means mounted to one side of said second vent within said outlet passageway and selectively cooperating therewith in varying degrees for closing said second vent and for opening said outlet passageway in varying degrees, so that varying amounts of the air without the building are drawn into said inlet passageway, and so that varying amounts of the air from said building are exhausted directly into the outside air through the outlet passageway.

CHARLES D. HARRIS.
     JOSEPH A. GALAZZI.

References Cited in the file of this patent

UNITED STATES PATENTS

| Number | Name | Date |
|---|---|---|
| 2,198,500 | Jewell | Apr. 23, 1940 |
| 2,260,275 | Kalischer | Oct. 21, 1941 |
| 2,315,222 | Philipp | Mar. 30, 1943 |
| 2,322,904 | Williams | June 29, 1943 |
| 2,333,374 | Guthrie | Nov. 2, 1943 |
| 2,472,792 | Cohler | June 14, 1949 |
| 2,519,086 | Eberhart | Aug. 15, 1950 |